(12) United States Patent
Toye et al.

(10) Patent No.: US 10,285,338 B2
(45) Date of Patent: May 14, 2019

(54) NETTING MATERIAL WITH REINFORCING FLAP AND EYELETS

(71) Applicant: NINE IP LIMITED, Auckland (NZ)

(72) Inventors: Jonathan Dallas Toye, Auckland (NZ); Dean Alan Kutschkau, Kennewick, WA (US)

(73) Assignee: NINE IP LIMITED, Auckland (NZ)

( * ) Notice: Subject to any disclaimer, the term of this patent is extended or adjusted under 35 U.S.C. 154(b) by 875 days.

(21) Appl. No.: 14/654,421

(22) PCT Filed: Dec. 18, 2013

(86) PCT No.: PCT/NZ2013/000238
§ 371 (c)(1),
(2) Date: Jun. 19, 2015

(87) PCT Pub. No.: WO2014/098621
PCT Pub. Date: Jun. 26, 2014

(65) Prior Publication Data
US 2015/0351330 A1    Dec. 10, 2015

(30) Foreign Application Priority Data

Dec. 21, 2012   (NZ) ....................................... 605205

(51) Int. Cl.
*A01G 13/02*   (2006.01)
*A44B 13/00*   (2006.01)
(Continued)

(52) U.S. Cl.
CPC ............. *A01G 13/02* (2013.01); *A01G 13/10* (2013.01); *A01M 29/32* (2013.01); *A01M 29/34* (2013.01); *A44B 13/0052* (2013.01); *A44B 13/0076* (2013.01); *A45F 3/52* (2013.01); *Y10T 24/3737* (2015.01); *Y10T 24/3742* (2015.01)

(58) Field of Classification Search
CPC .... A01G 13/02; A01G 13/10; A01G 13/0225; A01G 13/0268; A01G 13/0281; A01G 13/0275; A01G 2013/002; A01G 2013/006; A45F 3/52; A01M 3/002; A01M 29/30; A01M 29/32; A01M 29/34
See application file for complete search history.

(56) References Cited

U.S. PATENT DOCUMENTS 593,654 A    11/1897  Headley
805,814 A *  11/1905  Palmer .................. E04H 15/001
                                              135/115
(Continued)

FOREIGN PATENT DOCUMENTS

DE   20 2004 017 455 U1    4/2005
EP        1 716 747 A1    11/2006
(Continued)

*Primary Examiner* — Monica L Williams
*Assistant Examiner* — Michael A. Fabula
(74) *Attorney, Agent, or Firm* — Seed IP Law Group LLP

(57) ABSTRACT

A netting material having a length dimension and a width dimension much smaller than the length dimension comprises a flap folded from a fold region of the netting material along a longitudinal fold line at a distance from a longitudinal edge of the netting. The flap therefore comprises at least two layers of the netting material folded together. One or more eyelets are provided in the flap.

14 Claims, 11 Drawing Sheets

(51) Int. Cl.
  *A45F 3/52*  (2006.01)
  *A01M 29/32*  (2011.01)
  *A01G 13/10*  (2006.01)
  *A01M 29/34*  (2011.01)

(56) References Cited

U.S. PATENT DOCUMENTS

| | | | | |
|---|---|---|---|---|
| 1,051,692 A | | 1/1913 | Cowart | |
| 1,106,624 A | * | 8/1914 | Cadwallader et al. | E04F 10/02 135/903 |
| 2,015,471 A | * | 9/1935 | Genuit | A01G 13/0225 160/327 |
| 2,028,060 A | * | 1/1936 | Gilbert | A01G 13/10 114/219 |
| 2,028,220 A | * | 1/1936 | Kelly | A01G 13/0268 112/475.26 |
| 2,051,643 A | * | 8/1936 | Morrison | A01G 9/1407 112/417 |
| 2,118,474 A | * | 5/1938 | Morton | E04H 15/003 135/115 |
| 2,251,624 A | * | 8/1941 | Foree | A01G 13/0206 135/115 |
| 2,401,997 A | * | 6/1946 | Whitman | A01G 13/0268 24/363 |
| 3,339,309 A | * | 9/1967 | Stone | A01G 13/0268 47/29.1 |
| 3,374,797 A | | 3/1968 | Neumark | |
| 3,482,609 A | * | 12/1969 | Neckerman | A01G 13/0268 139/383 R |
| 3,769,747 A | * | 11/1973 | Chapman, Jr. | A01G 13/0268 160/DIG. 7 |
| 4,044,501 A | * | 8/1977 | Frydryk | A01G 13/0268 428/121 |
| 4,065,889 A | * | 1/1978 | Fraioli | E04H 15/20 160/DIG. 7 |
| 4,100,706 A | * | 7/1978 | White | A01M 29/32 47/1.01 F |
| 4,537,210 A | * | 8/1985 | Montgomery | E04H 15/003 135/115 |
| 4,763,440 A | * | 8/1988 | James | A01G 13/0206 47/2 |
| 4,852,194 A | * | 8/1989 | Langan | A47D 15/005 256/23 |
| 5,052,686 A | * | 10/1991 | Pryor | A63B 61/003 473/494 |
| 5,083,396 A | * | 1/1992 | Traut | A01G 13/10 47/22.1 |
| 5,097,624 A | * | 3/1992 | Klayman | A01G 13/10 47/31 |
| D331,864 S | * | 12/1992 | Sciubba | D8/1 |
| 5,199,215 A | * | 4/1993 | Lopez | E01F 8/02 47/56 |
| 5,419,376 A | | 5/1995 | Hawkins et al. | |
| 5,451,445 A | * | 9/1995 | Wang | A01G 13/0206 160/84.01 |
| D386,653 S | * | 11/1997 | Brown | D8/1 |
| 5,763,031 A | | 6/1998 | Huang | |
| 9,788,639 B2 | * | 10/2017 | Frazer | A45F 3/22 |
| 9,883,637 B2 | * | 2/2018 | Toye | A01G 13/0206 |
| 2002/0043543 A1 | * | 4/2002 | McMurray | B60R 7/005 224/563 |
| 2003/0121202 A1 | * | 7/2003 | Hinsperger | A01G 20/20 47/9 |
| 2004/0088914 A1 | * | 5/2004 | Warner | A01G 13/0206 47/20.1 |
| 2007/0194583 A1 | | 8/2007 | Coles et al. | |
| 2008/0072944 A1 | * | 3/2008 | Wu | A45F 3/22 135/90 |
| 2011/0113683 A1 | * | 5/2011 | Morgan | A01G 13/0206 47/22.1 |
| 2015/0064415 A1 | * | 3/2015 | Verlinde | B32B 5/142 428/193 |
| 2015/0201565 A1 | * | 7/2015 | Toye | A01G 13/0206 47/29.1 |
| 2016/0120137 A1 | * | 5/2016 | Toye | A01G 22/00 47/31 |

FOREIGN PATENT DOCUMENTS

| | | |
|---|---|---|
| EP | 1 728 417 A2 | 12/2006 |
| WO | WO 2010/120201 A2 | 10/2010 |
| WO | WO 2010/120201 A3 | 10/2010 |

* cited by examiner

NETTING MATERIAL WITH REINFORCING FLAP AND EYELETS

FIELD OF INVENTION

The invention relates to netting materials and particularly but not exclusively to netting materials for use as bird netting, insect netting, shade netting, wind screen netting, or hail protection netting for example or in other agricultural applications.

BACKGROUND

Bird netting, insect netting, shade netting, wind screen netting, or hail protection netting may be placed near plants to protect for example annual plants, perennial plants, fruit trees, or grape vines, from birds, insects, excessive sun, wind, or hail. Typically the netting is supported over the plant(s) and/or as a vertical and/or angled wall or walls near the plant(s), by for example cables or wires between posts positioned along the rows of plants in a garden, field crop, orchard or vineyard, or is draped over the plant(s) or is laid on the ground.

SUMMARY OF INVENTION

In one aspect the invention comprises a netting material having a length dimension and a width dimension much smaller than the length dimension, the netting material comprising:
  a flap folded from a fold region of the netting material along a longitudinal fold line at a distance from a longitudinal edge of the netting, the flap comprising at least two layers of the netting material folded together, and
  one or more eyelets in the flap.

Preferably the flap comprises a strip of material attached to the netting to reinforce the flap, the one or more eyelets provided through the strip of material and the folded fold region of the netting material. In one embodiment the strip of material is a continuous strip extending longitudinally along the length of the flap, and eyelets provided through the strip of material and the folded fold region of the netting material, the eyelets spaced apart along the length of the flap. In another embodiment the strip of material is attached to the netting in separate lengths spaced apart along the length of the netting material to form spaced apart flaps each comprising a piece of the strip of material, at least two layers of the netting material, and one or more eyelets. Each separate length the strip of material may comprise one eyelet only.

In one embodiment the strip of material is provided to one side of the flap. Alternatively the strip of material is folded along the longitudinal fold line to be provided to both sides of the flap with the folded fold region of the netting sandwiched between.

In one embodiment the strip of material is bonded to the netting material. Alternatively, the strip of material is stitched to the netting material. Preferably the strip of material is stitched to the netting material, and the strip material on each side of the longitudinal fold line being stitched together.

Preferably at least a portion of the fold region of the netting material is reinforced. In one embodiment the netting comprises a higher density knitted, woven or non woven construction in at least a portion of the fold region of the netting material than outside the fold region. For example, the netting is knitted or woven or non woven from warp and weft yarns, and the netting comprises a higher density of warp yarns in at least a portion of the fold region of the netting than outside the fold region.

In another embodiment, the netting material is knitted, woven or non woven from yarns and comprises a higher strength yarn in at least a portion of the fold region of the netting material than outside the fold region. For example, the netting is woven or non woven from warp and weft yarns, and the netting comprises higher strength warp yarns in at least a portion of the fold region of the netting than outside the fold region. For example, the yarn in at least a portion of the fold region is wider or thicker or heavier than the yarn outside the fold region.

In some embodiments, the netting material inside the fold region comprises a different construction to the netting material outside the fold region. In some embodiments, the netting material inside the fold region comprises a pillar type knitted construction and the netting material outside the fold region comprises a different knitted construction. In some embodiments, the netting material inside the fold region comprises rectangular apertures and the netting material outside the fold region comprises one or more of hexagonal, diamond or triangular apertures. In some embodiments, the weight per area of the netting material in the fold region is higher than the weight per area of the netting material outside the fold region. In some embodiments, the weight per area of the netting material in the fold region is 5% to 1000% higher than the weight per area of the netting material outside the fold region. In some embodiments, the netting material in the fold region comprises a weight per area of greater than 170 grams/m$^2$ and the netting material outside the fold region comprises a weight per area of less than 170 grams/m$^2$. In some embodiments, the weight of the netting in the fold region is in the range of 180 grams/m$^2$ to 280 grams/m$^2$ and the weight of the netting outside the fold region is in the range of 25 grams/m$^2$ to 160 grams/m$^2$. In some embodiments, the netting material in the fold region comprises a weight per area of greater than 100 grams/m$^2$ and the netting material outside the fold region comprises a weight per area of less than 50 grams/m$^2$.

In one embodiment the netting material outside the fold region of the netting comprises air space apertures having a widest dimension of 2 mm-30 mm and at least a portion of the fold region of the netting comprises air space apertures having an aperture width dimension of less than 10 mm. In one embodiment the netting material outside the fold region of the netting comprises air space apertures having a widest dimension of 5 mm-25 mm and at least a portion of the fold region of the netting comprises air space apertures having an aperture width dimension of less than 5 mm. Preferably the netting material outside the fold region of the netting comprises air space apertures having a widest dimension of 4 mm-25 mm and at least a portion of the fold region of the netting comprises air space apertures having an aperture width dimension of less than 4 mm. More preferably the netting material outside the fold region of the netting comprises air space apertures having a widest dimension of 3 mm-25 mm and at least a portion of the fold region of the netting comprises air space apertures having an aperture width dimension of less than 3 mm.

In one embodiment the netting material in the fold region of the netting has a higher cover factor than the netting material outside the fold region. In one embodiment, the netting material outside the fold region of the netting comprises a cover factor (herein described) of less than 40% and the fold region of the netting comprises a cover factor (herein described) of greater than 40%. In one embodiment the netting material in the fold region of the netting has a cover factor the same or similar to the cover factor of the netting material outside the fold region.

In various embodiments the netting material has a cover factor (as herein defined) of less than 80%, or less than 70%, or less than 60%, or less than 50%, or less than 40%, or less than 30%, or less than 20%, or less than 10%, or less than 5%. And in various embodiments at least a portion of the fold region of the netting has a cover factor (as herein defined) of greater than 90%, or greater than 80%, or greater than 70%, or greater than 60%, or greater than 50%, or greater than 40%, or greater than 30% or greater than 20% or greater than 10%.

In one embodiment the fold region on one side of the longitudinal fold line is reinforced. Alternatively, substantially the full width of the fold region of the netting is reinforced.

In one embodiment, the fold region is folded to create the flap comprising four layers of netting material.

In one embodiment the fold region is folded to create the flap with a height of 35 mm to 55 mm.

In one embodiment the flap is formed 20 mm to 500 mm from a longitudinal edge of the netting material. In one embodiment the flap is formed 20 mm to 300 mm from a longitudinal edge of the netting material.

In one embodiment the netting material comprises two said flaps; each flap located a distance from a corresponding longitudinal side of the netting material. In another embodiment, the netting material comprises another said flap at or near to a centre of the width of the netting material.

Preferably the yarn is formed from polyethylene or more preferably high density polyethylene.

In various embodiments the material is of denier 50 to 2000, or denier 100 to 1000, or denier 300 to 800, or denier 400 to 600.

The netting is one of a bird netting, an insect netting, a shade netting, a wind screen netting and a hail protection netting.

In another aspect the invention comprises a method of treating a plant or fruit or vegetables thereon which comprises providing over and/or adjacent the plant as bird netting, insect netting, shade netting, wind screen netting, or hail protection netting a netting material according to any one of the above statements.

By "netting" is meant:
in the case of knitted material, material having a cover factor (as herein defined) of up to 80% but typically less than 70%, 60%, 50%, 40%, 30%, 20%, 10% or 5% or 2%;
in the case of woven material, material having a cover factor (as herein defined) less than 80% but typically less than 70%, 60%, 50%, 40%, 30%, 20%, 10% or 5% or 2%; and
in the case of non-woven material, material having a cover factor (as herein defined) of up to 80% but typically less than 70%, 60%, 50%, 40%, 30%, 20%, 10% or 5% or 2%.

By "cover factor" is meant the percentage of the overall area of the netting material which comprises knitted, woven, or non-woven monofilament, yarn, or tape or a combination, forming the netting itself, judged from perpendicular to the plane of the netting when laid out flat, as opposed to air space in between the netting. Thus if a netting has a cover factor of 30% then the air space through the netting would be 70% of the total area of the netting.

"Woven netting" includes extruded netting, comprising crossed strands heat welded or chemically bonded together.

The term "yarn" as used in this specification, unless the context suggests otherwise is intended to mean multi or mono filament yarn, threads or fibres. The term "yarn" unless the context suggests otherwise, is intended to include longitudinally extending single filament elements having four sides when viewed in cross-section, such as a rectangular or square cross-section, also longitudinally extending elements having a multisided cross-section such as a triangular or hexagonal cross-section for example, and also longitudinally extending elements having a circular or oval or similar cross-section (sometimes referred to hereafter as monofilament).

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples only.

BRIEF DESCRIPTION OF THE DRAWINGS

The invention is further described by way of example with reference to the accompanying drawings in which.

DETAILED DESCRIPTION OF EMBODIMENTS

Netting material of the invention may be knitted from a synthetic monofilament, multifilament yarn, or tape or a combination thereof, formed from a resin that may or may not comprise a pigment or pigments.

FIGS. 1 to 10 show by way of example sections of netting material.

Figure 1:
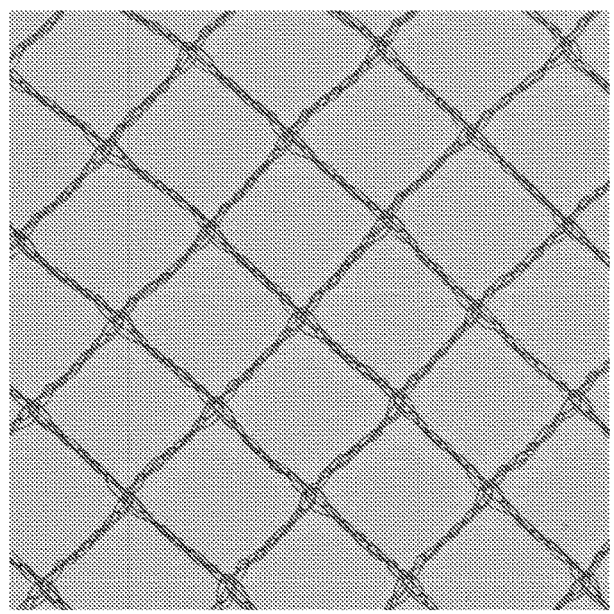
FIG. 1 shows a section of one form of knitted diamond monofilament netting, having a cover factor of approximately 3-10%

FIG. 1 shows a section of one form of knitted diamond monofilament netting. The netting has a cover factor of approximately 3-10%. The netting is knitted in a diamond structure of around 18 mm across.

Figure 2:
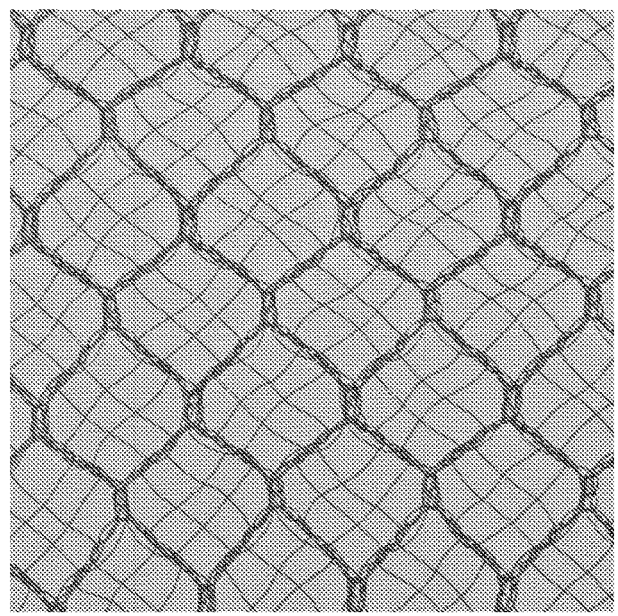
FIG. 2 shows a section of another form of knitted diamond monofilament netting, with four cross over yarns having a cover factor of approximately 10-20%

FIG. 2 shows a section of another form of knitted diamond monofilament netting with four cross over yarns. The netting has a cover factor of approximately 10-20%. The netting is knitted in a diamond structure of around 16 mm across but with four additional strands of monofilament across the diamond.

Figure 3:
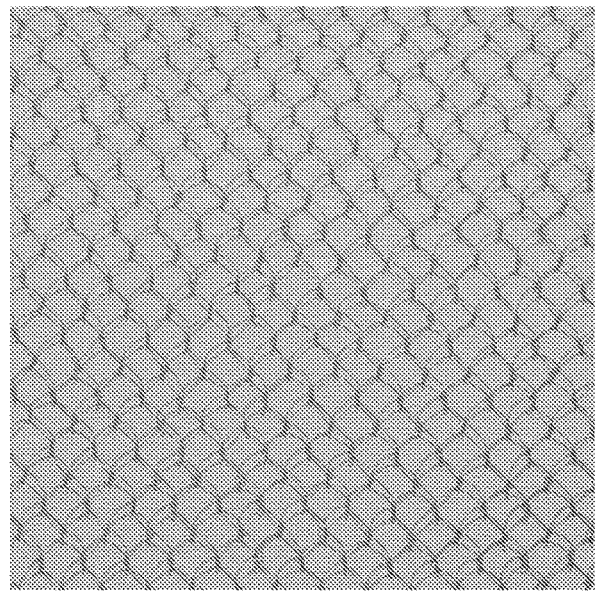
FIG. 3 shows a section of another form of knitted diamond monofilament netting, having a cover factor of approximately 10-20%

FIG. 3 shows a section of a form of knitted diamond shaped monofilament netting. The netting has a cover factor of approximately 10-20%. The netting is knitted in a diamond shaped structure of around 4 mm across.

Figure 4:
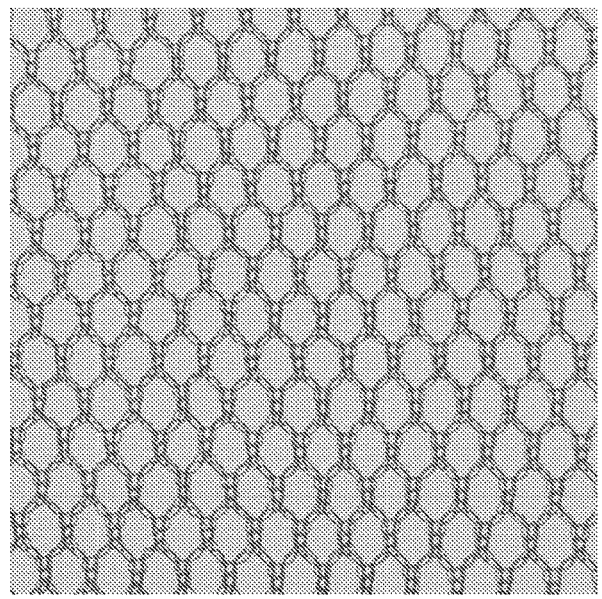
FIG. 4 shows a section of one form of knitted hexagonal monofilament netting, having a cover factor of approximately 10-20%

FIG. 4 shows a section of one form of knitted hexagonal monofilament netting. The netting has a cover factor of approximately 10-20%. The netting is knitted in a hexagonal structure of around 5 mm across the hexagonal apertures.

Figure 5:
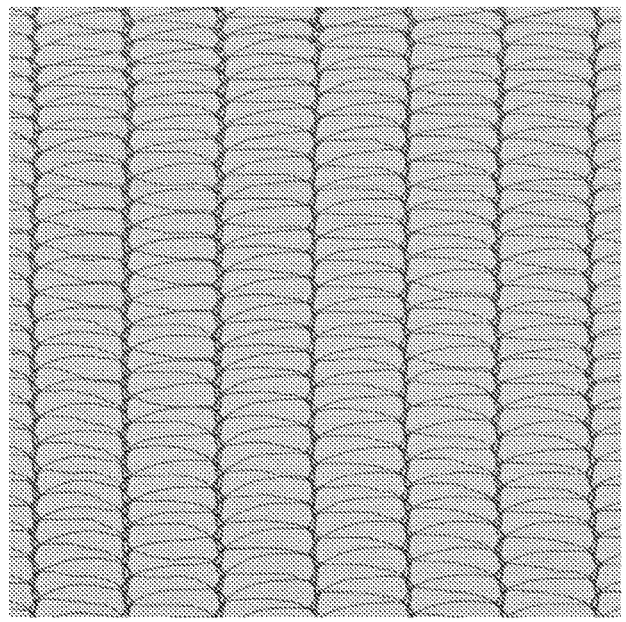
FIG. 5 shows a section of a form of knitted pillar based monofilament netting, having a cover factor of approximately 5-15%.

FIG. 5 shows a section of a form of knitted pillar based monofilament netting. The netting has a cover factor of approximately 5-15%. The pillars are joined by knitted monofilaments across the pillars.

Figure 6:
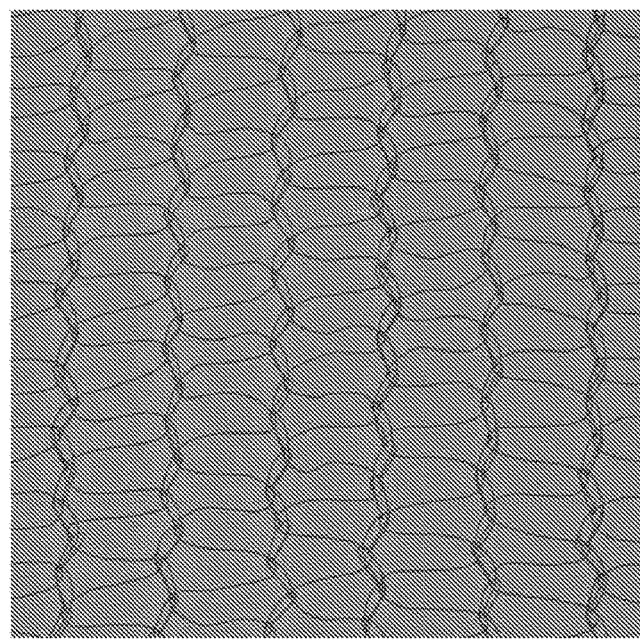
FIG. 6 shows a section of another form of knitted pillar based monofilament netting, having a cover factor of approximately 5-15%.

FIG. 6 shows a section of another form of knitted pillar based monofilament netting. The netting has a cover factor of approximately 5-15%. The pillars are similar size to FIG. 5 and are joined by monofilaments that loop through the pillars.

Figure 7:
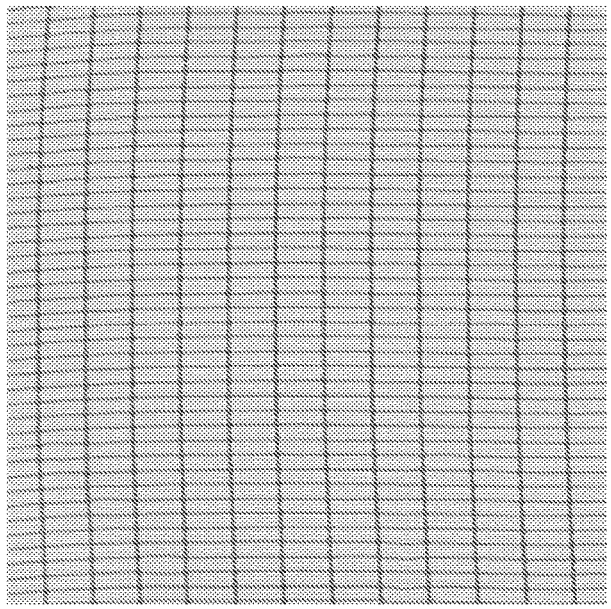
FIG. 7 shows a section of one form leno woven based monofilament netting, having a cover factor of approximately 30-40%.

FIG. 7 shows a section of one form of a leno type woven monofilament netting. The netting has a cover factor of approximately 30-40%. The leno construction has the warp monofilaments wrap around, over and under the weft monofilaments.

Figure 8:
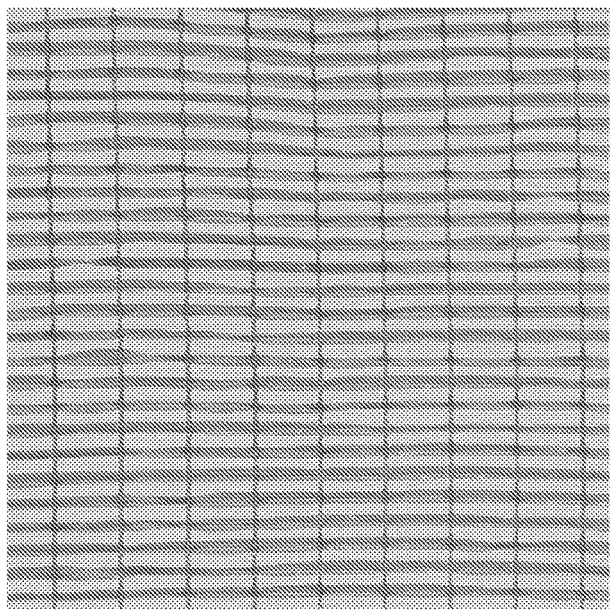
FIG. 8 shows a section of another form of leno woven based tape netting, having a cover factor of approximately 20-30%.

FIG. 8 shows a section of another form of leno woven based monofilament and tape netting. The netting has a cover factor of approximately 20-30%. The leno construction has the warp monofilaments wrap woven around the weft tapes.

Figure 9:
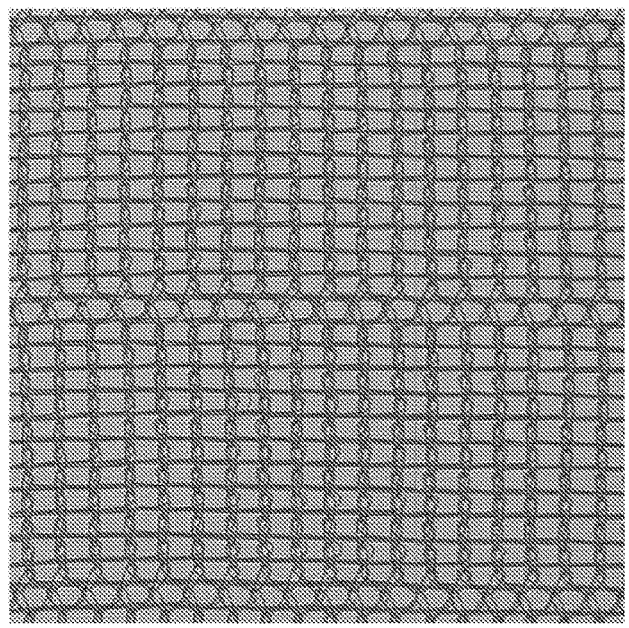
FIG. 9 shows a section of one form of knitted monofilament netting, having a cover factor of approximately 30-40%.

FIG. 9 shows a section of one form knitted monofilament netting. The netting has a cover factor of approximately 30-40%, with small apertures.

Figure 10:
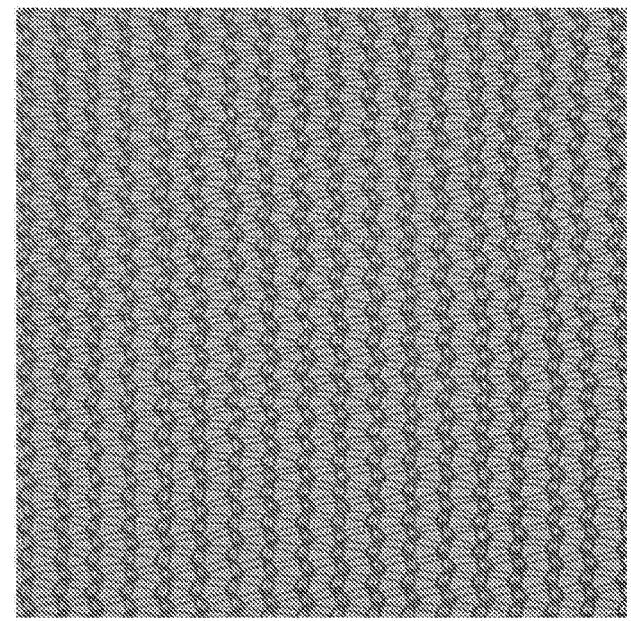
FIG. 10 shows a section of one form of knitted monofilament netting, having a cover factor of approximately 40-50%.

FIG. 10 shows a section of one form knitted monofilament netting. The netting has a cover factor of approximately 40-50%, with smaller apertures.

Typically reflective netting of the invention has a cover factor of 50% or less. Where the netting is knitted shade cloth however, for example, it may have a higher cover factor, up to 80% but typically still less than 70%. Where the netting is woven shade cloth however, for example, it may have a higher cover factor, up to 80% but typically still less than 70%.

In some embodiments netting of the invention may comprise air space apertures through the material of widest dimension about 30 mm. In other embodiments netting of the invention may comprise air space apertures through the material of widest dimension about 20 mm. In some embodiments netting of the invention may comprise apertures through the material of widest dimension in the range 2-30 mm.

The netting may be knitted or woven or formed in a non-woven construction, from monofilament or multifilament yarns, or tape or a combination. Multifilament yarns may comprise multiple synthetic fibres twisted together. Tape may for example be formed by extruding synthetic sheet material from the resin, and then cutting the extruded sheet material to form long tapes of typically 1 to 5 mm of width.

Typically the netting is supported over the plant(s) and/or as a vertical and/or angled wall or walls near the plant(s), or on the ground itself, by for example cables or wires between posts positioned along the rows of plants in a garden, field crop, orchard or vineyard, or is draped over the plant(s) as bird netting, insect netting (for repelling for example mosquitoes, or as for example bee exclusion netting), shade netting, windbreak netting, or hail protection. Netting may be placed near plants to protect for example annual plants, perennial plants, fruit trees, or grape vines, vegetable plants, from birds, insects, excessive sun, wind, or hail.

Cables or wires or ropes or other securing devices or fasteners are coupled to the netting to anchor the netting to the ground or support structure. The netting material may not provide sufficient strength to allow fasteners to hook or secure directly to or through the apertures of the netting.

Various embodiments of a netting material according to the present invention are described with reference to FIGS. 11 to 17. To provide sufficient strength for securing the netting material in place, grommets or eyelets or openings are provided to the netting. Cables or wires or ropes or other securing devices or fasteners tie to or pass through or hook or otherwise engage with the grommets or eyelets. To provide a location for the eyelets, a longitudinal flap 20 is created in the netting material 10, by folding a fold region 21 of the netting to create the flap comprising at least two layers 21a and 21b of the netting material. In one embodiment the flap 20 is created in the netting material adjacent at least one longitudinal edge 26 of the netting. For example, the fold region of the netting is located 20 mm to 2 m from a longitudinal edge of the netting. Preferably the flap is located within 1 m of a longitudinal edge of the netting material. In a preferred embodiment, the flap is formed 20 mm to 500 mm from a longitudinal edge of the netting material, for example a preferred distance is 300 mm from a longitudinal edge of the netting material.

In a preferred embodiment the netting material comprises a first folded flap a distance from a first longitudinal edge of the netting material, and a second folded flap a distance from the opposite second longitudinal edge. In a further embodiment, the netting material comprises alternatively or additionally a folded flap on or near to a longitudinal centreline of the netting material. This allows the fabric to be attached to a support structure in the centre region as well as the sides.

The fold region is folded along a longitudinal fold line 22 to create the flap. The longitudinal fold line 22 forms a tip of the flap distal from a root of the flap where the flap extends from a general plane of the netting material with the netting material laid out on a flat surface. Longitudinal perimeter or boundary fold lines 23 form the root of the flap at the general plane of the netting. Eyelets 25 are formed in the flap. The folded fold region 20 of the netting provides a double layer of netting for the flap and therefore improved strength compared to an unfolded portion of the netting. The flap is created by folding the netting material against itself along the longitudinal fold line 22, to bring two perimeter fold lines 23 of the fold region together. Thus the fold region provides a fold or flap of netting material that extends from the general plane of the netting material.

Figure 12A:
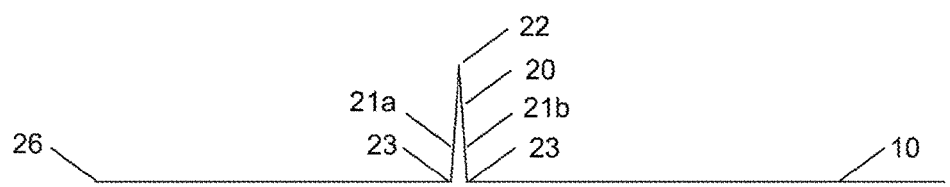
FIG. 12A shows a schematic representation of a cross section of a longitudinally extending flap formed in netting material comprising a folded section of the netting material.
Figure 12B:
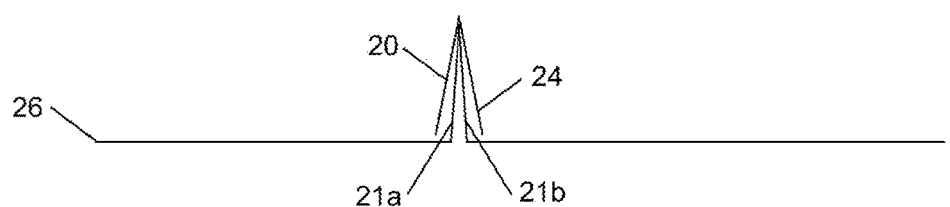
FIG. 12B shows a schematic representation of a cross section of a longitudinally extending flap formed in netting material comprising a folded section of the netting material and a strip material to reinforce the flap.

FIGS. 12A and 12B illustrate the flap in a slightly open form to illustrate the two layers 21a and 21b of the folded flap of material. However, in practice the two layers of the folded netting material are preferably brought together so that at least portions of the two layers make contact. For example at least an area around each eyelet 25 (FIG. 13) and along the longitudinal boundaries 23 of the fold region 21 make contact.

In one preferred embodiment, additional strength is added to the flap or fold region by a strap 24 of material provided to the flap or fold region, as best shown by the schematic representation of FIG. 12B. Eyelets 25 are provided to the folded region of the netting and to the strap of material provided to the flap or folded region of the netting. The strap or strip of material may be a strap of canvas or cloth material or may be formed from other sheet material, for example a polyethylene sheet material or woven monofilament strapping or knitted monofilament strapping or woven tape strapping.

In one embodiment, the strap 24 is provided to the fold region 20 of the netting prior to folding the fold region to create the eyelet flap. For example, the strap is chemically bonded or stitched or heat welded or otherwise fixed to the fold region of the netting. The fold region or the fold region and the strap are then folded along the longitudinal fold lines 22 and 23 to form the flap for eyelets to be formed in the flap. Once folded along the longitudinal fold lines, inside facing surfaces of the fold region are brought together.

In an alternative embodiment, the strap material is provided to the fold region after the fold region has been folded along the longitudinal fold line to form the flap of netting material. The strip material 24 is folded along fold line preferably centrally located along the strip of material to cover the folded flap of netting material. For example, for a 40 mm high flap, an 80 mm wide strip material is folded along a centreline to sandwich the 40 mm high flap of netting material between.

Once folded to form the flap, grommets are provided through flap comprising the strip of material and the folded region of the netting. Preferably stitching is also provided to the flap. For example, the strap material on either side of the longitudinal fold line is sewn or stitched together. For example, the strap material on either side of the longitudinal fold line is stitched together along or near the longitudinal perimeter 23 of the flap at or near the root of the flap and additionally stitching could be added along or near 22 to give two lines of stitching. Alternatively or additionally the strap material on either side of the longitudinal fold line is chemically bonded together or heat welded together, for example longitudinal perimeter 23 of the flap at or near the root of the flap and/or in other areas of the flap, for example around the perimeter of the eyelets formed in the flap.

In a less preferred embodiment, the strap material is bonded or adhered or otherwise fixed to the fold region on one side of the longitudinal fold line only, either before or after the flap is folded from the fold region of the netting. In the preferred embodiment, the strap material is folded on the longitudinal fold line 22 to sandwich the folded netting in between the strap material each side of the fold line 22.

Figure 13:
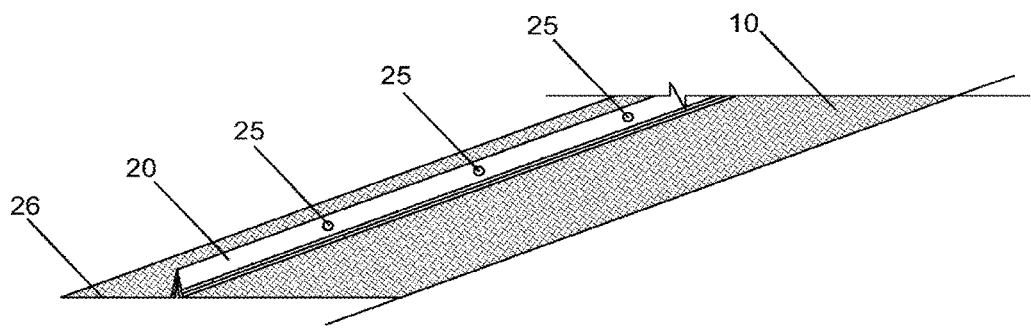
FIG. 13 shows a schematic representation of a section of netting material comprising a flap with a strip material to reinforce the flap extending longitudinally along the netting material with eyelets formed in the flap.

Preferably the strap material is provided on an outside of the fold region or flap of material as illustrated in FIGS. 12B and 13. In a less preferred embodiment, the strap material is provided to an inside of the folded flap of netting. The strap material 24 is provided to an underside of the fold region, and the fold region is then folded to form the flap with the netting of the fold region on the outward facing surfaces of the strap material. In one embodiment, a single layer of strap material equal to the height of the flap is provided to the fold region in between the layers of folded netting of the fold region either side of the longitudinal fold line. In this embodiment the folded netting material is positioned on outwardly facing surfaces of the strip material.

Figure 14:
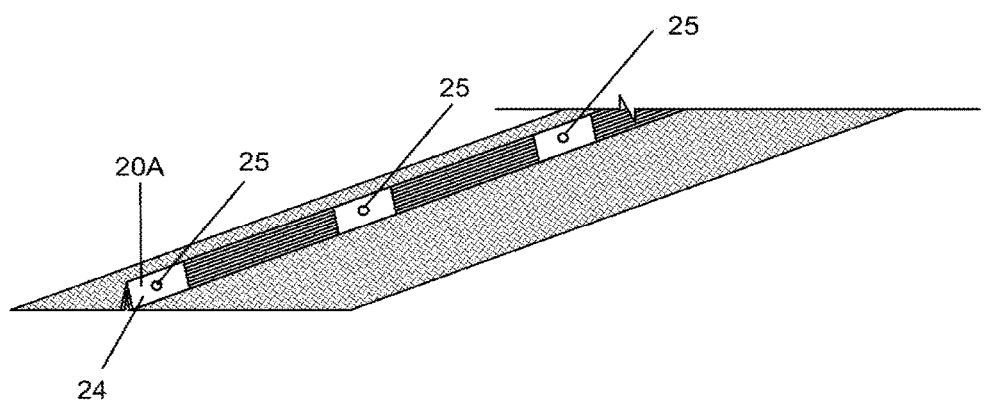
FIG. 14 is a schematic representation of a section of netting material comprising a flap extending longitudinally along the netting material with eyelets formed in the flap, and with separate sections of a strip material provided at each eyelet to reinforce the flap at the eyelets.

In a preferred embodiment, the strap or reinforcing material 24 is provided in separate parts or small sections along the length of the netting material. For example, a piece of reinforcing strap or material is provided at each grommet location along the netting material, as illustrated in FIG. 14. Alternatively, each individual piece of reinforcing material may bridge two or three or four eyelets depending on the longitudinal spacing of the eyelets along the netting. As described above in relation to the embodiment comprising a continuous length of strap material illustrated in FIG. 13, the individual lengths of reinforcing material may be provided to the netting material prior to or after folding the fold region to form the flap of netting material.

In the example of a separate piece of reinforcing material being provided at each eyelet, once folded along the longitudinal fold lines 22, 23, inside facing surfaces of the fold region of the netting are brought together at each individual piece of reinforcing material 24. This construction comprises short individual reinforced flaps 20a spaced apart along the length of the netting material, as illustrated in FIG. 14. Areas of netting in the fold region in between adjacent flaps 20a may unfold (not shown) where that part of the netting is stretched or pulled taunt. Once folded along the longitudinal fold lines, inside facing surfaces of the fold region are brought together but only for the length of the strapping 24 at each eyelet 25. Alternatively a continuous longitudinal flap of netting material may be formed to not separate in areas of the fold region between adjacent pieces of strip material 24 when the netting is stretched. For example, the two layers of netting forming the flap of netting may be fixed together along the length of the netting. For example the two layers of netting forming the flap of netting may be stitched or otherwise fixed together, for example by chemical bonding or heat welding, along the length of the netting. For example the two layers of netting may be fixed together along the longitudinal boundary lines 23 (FIG. 11) of the fold region. Spaced apart pieces of reinforcing material may be provided to the flap of netting formed along the length of the netting.

Figure 15A:
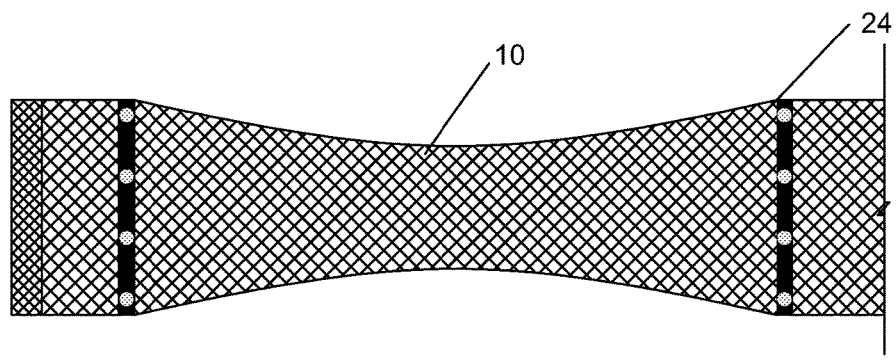
FIG. 15A is a schematic representation of a section of netting material comprising a flap extending longitudinally along the netting material with eyelets formed in the flap, and with a continuous strip of material provided to reinforce the flap, the netting material pulled taunt.
Figure 15B:
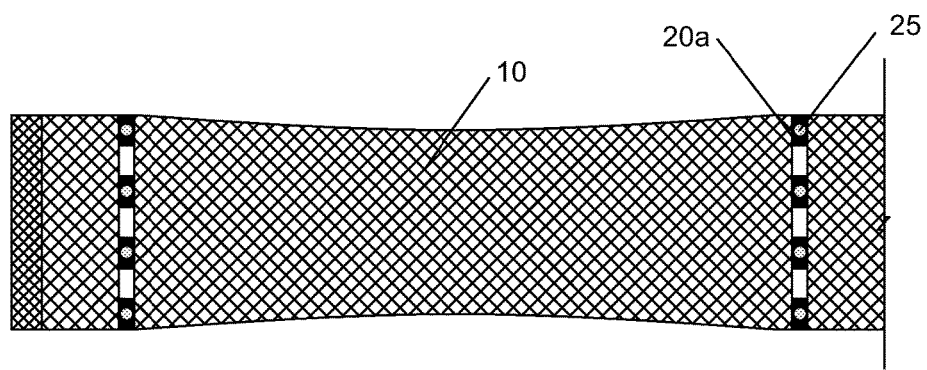
FIG. 15B is a schematic representation of a section of netting material comprising a flap extending longitudinally along the netting material with eyelets formed in the flap, and with separate sections of a strip material provided at each eyelet to reinforce the flap at the eyelets, the netting material pulled taunt.

An advantage of having strapping only at or around each eyelet area is that longitudinal stretch of the netting material is significantly maintained. In the earlier described embodiment comprising a continuous length of strapping material 24, the continuous length of strapping reduces the total flexibility of the netting material. For expandable netting that is made to be expanded after manufacture, the loss in flexibility at the flap 20 causes the fabric to have a non rectangular shape as illustrated schematically in FIG. 15A. By localising the reinforcing material 24 around each eyelet, flexibility or expandability of the netting material is significantly maintained, and the shape of the netting is less distorted, as illustrated schematically in FIG. 15B. FIGS. 15A and 15B illustrate the difference in shape between a netting material comprising a flap with a continuous length of strapping material 24 and a netting material comprising a flap with separate lengths of strapping material 24a. As illustrated, the netting in FIG. 15B maintains a more even or rectangular shaped compared to the netting illustrated in FIG. 15A.

The flap preferably has a height of about 30 to 100 mm. More preferably the flap has a height of about 30 to 60 mm. Even more preferably the flap has a height of about 30 to 50 mm. In a most preferred embodiment, the flap has a height of about 35 to 45 mm, for example a height of about 40 mm. By example a flap height of 40 mm is folded from a fold region that spans 80 mm of the width of the netting material prior to folding the fold region to form the flap of netting material.

In a further embodiment, the fold region 21 is folded to create two folds of netting material to create a flap comprising four layers of netting material. For example, a fold region 160 mm wide may be folded to create a flap comprising four layers 40 mm and with a height of 40 mm. The fold region may comprise even more layers of folded netting material, for example six or more.

The eyelets 25 preferably comprise grommets defining holes through the flap. For example the grommets are formed from brass, aluminium, steel or stainless steel, or plastic. In an alternative form, the strap material is formed from synthetic resin and the eyelets are formed as holes through the strap material with a perimeter of the holes heat sealed to integrate the sheet material on each side of the longitudinal fold line together at the perimeter of each eyelet and/or with the netting material.

The eyelets are spaced apart along the longitudinal length of the flap. For example the eyelets are spaced apart by a longitudinal distance of 100 mm to 500 mm, or 100 mm to 400 mm, or 100 mm to 300 mm, or 100 mm to 200 mm. In a preferred embodiment the longitudinal spacing of the eyelets is about 150 mm. The most preferred longitudinal spacing is 300 mm.

In a preferred embodiment at least a portion of the fold region of the netting material is reinforced in an area of the flap that receives the eyelets 25. To reinforce the fold region of the netting, in one embodiment the netting material comprises a higher density knitted, woven or non woven construction in at least a portion of the fold region of the netting material compared to the density of construction of the netting outside the fold region.

In one embodiment where the netting material is woven or non woven from warp yarns and weft yarns, the netting comprises a higher density of warp yarns in at least a portion of the fold region of the netting than outside the fold region. For example, warp yarns in the fold region may be spaced apart by a spacing distance of 1 mm to 10 mm, whereas outside the fold region the warp yarns are spaced apart by a distance of 10-30 mm. Where the netting is of a knitted construction, the netting in the fold region comprises a tighter or closer knitted construction than outside the fold region.

In one embodiment the netting material outside the fold region of the netting comprises air space apertures having a widest dimension of 2 mm-30 mm and at least a portion of the fold region of the netting comprises air space apertures having an aperture width dimension of less than 10 mm to reinforce the flap.

In some embodiment, air space apertures outside the fold region have widest dimension of 5 mm-25 mm and at least a portion of the fold region of the netting comprises air space apertures having an aperture width dimension of less than 5 mm. In some embodiments, air space apertures outside the fold region have widest dimension of 4 mm-25 mm and at least a portion of the fold region of the netting comprises air space apertures having an aperture width dimension of less than 4 mm. In some embodiments the netting material outside the fold region of the netting comprises air space apertures having a widest dimension of 3 mm-25 mm and at least a portion of the fold region of the netting comprises air space apertures having an aperture width dimension of less than 3 mm.

Figure 18:
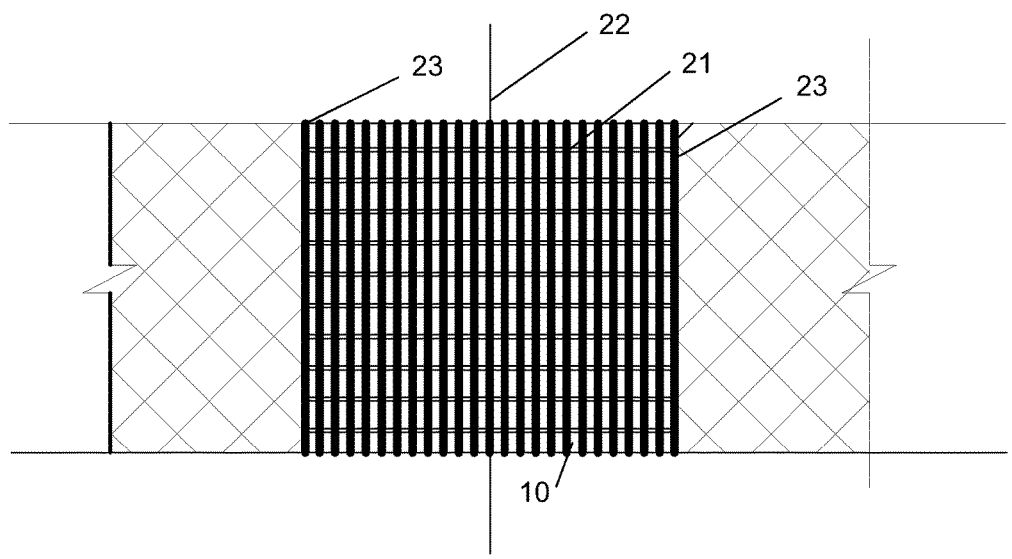
FIG. 18 is a representation of a section of netting material comprising a different construction in a fold region of the netting to a construction of the netting outside the fold region.

In some embodiments the netting material inside the fold region comprises a different construction to the netting material outside the fold region. For example, in one embodiment, the netting material inside the fold region comprises a pillar type knitted construction, and the netting material outside the fold region comprises a different knitted construction. For example, the netting material outside the fold region may comprise one or more of a hexagonal, diamond or triangular shaped aperture knitted construction. A section of an example netting material comprising rectangular shaped apertures in the fold region and diamond shaped apertures outside the fold is illustrated in FIG. 18. For example, the netting material may comprise rectangular shaped apertures in the fold region having a width dimension of less than 5 mm and diamond shaped apertures having a width of 5 mm-25 mm outside the fold region. The example netting of FIG. 18 comprises rectangular apertures with a width of about 2 mm and length of about 10 mm in the fold region and diamond shaped apertures with a width of about 20 mm when the netting is stretched out but not pulled taunt. In some embodiments, the netting material comprises a different construction to the netting material outside the fold region, and the air space apertures in the fold region of the netting have a width dimension that is about the same as a widest dimension of the air space apertures of the netting outside the fold region. For example, in one embodiment, the netting material may comprise rectangular shaped apertures in the fold region having a width dimension of about 4 mm and diamond shaped apertures having a width of about 4 mm outside the fold region.

Figure 11:
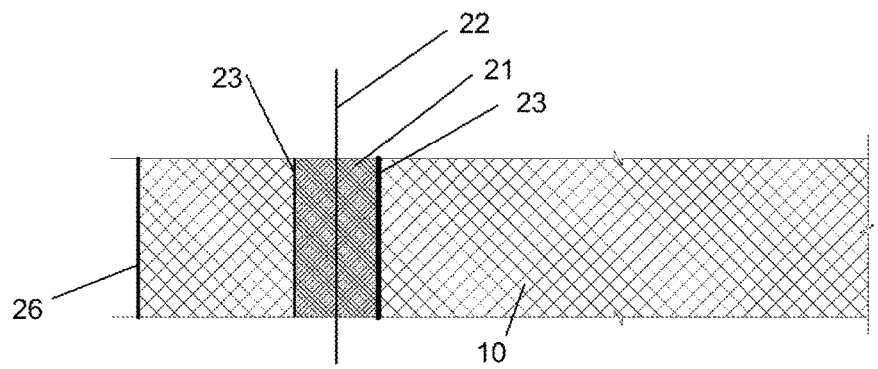
FIG. 11 shows a schematic representation of section of netting material comprising a longitudinally extending fold region for forming a flap of netting material.
Figure 16:
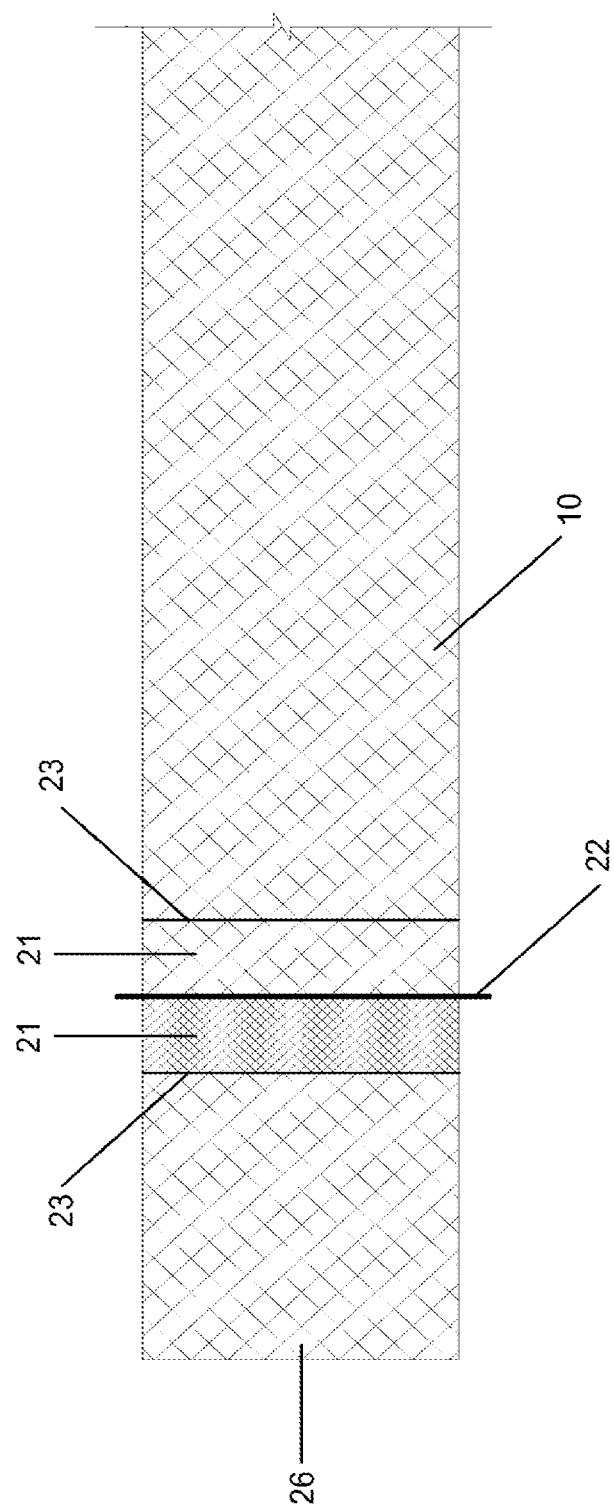
FIG. 16 shows a schematic representation of a section of netting material comprising a longitudinally extending fold region for forming a flap of netting material, with one half of the fold region comprising a higher density construction for reinforcement.

Substantially the full width of the fold region of the netting may be reinforced as illustrated in FIG. 11. Alternatively a portion of the fold region may be reinforced, for example one half of the fold region between one of the perimeter fold lines 23 and the central fold line 22, as illustrated in FIG. 16. In FIG. 16, one half of the fold region comprises a reinforced construction, and the construction of the other half of the flap is the same as the netting construction outside the fold region.

The reinforced area of the fold region may also be compared to unreinforced areas of the netting in terms of the cover factor of the netting. In one embodiment the netting material outside the fold region of the netting comprises a cover factor (herein described) of less than 40% and the fold region of the netting comprises a cover factor (herein described) of greater than 40%.

The reinforced area of the fold region may also be compared to unreinforced areas of the netting in terms of the weight of the netting per area. In some embodiments, the weight of the netting material in the fold region is higher than the weight of the netting material outside the fold region. For example, in one embodiment the weight of the netting material in the fold region is 5% to 1000% higher than the weight of the netting material outside the fold region. In some embodiments, the netting material in the fold region comprises a weight per area of greater than 170 grams/m$^2$ and the netting material outside the fold region comprises a weight per area of less than 170 grams/m$^2$. In some embodiments, the weight of the netting in the fold region is in the range of 180 grams/m$^2$ to 280 grams/m$^2$ and the weight of the netting outside the fold region is in the range of 25 grams/m$^2$ to 160 grams/m$^2$. In some embodiments, the netting material in the fold region comprises a weight per area of greater than 100 grams/m$^2$ and the netting material outside the fold region comprises a weight per area of less than 50 grams/m$^2$.

In another embodiment, the reinforced area of the fold region comprises stronger or larger cross section yarns compared to the strength or cross section of the yarns outside the fold region. For example, in one embodiment where the netting material is woven or non woven from warp yarns and weft yarns, the netting comprises thicker and/or wider warp yarns in at least a portion of the fold region of the netting than outside the fold region. For example, warp yarns in the fold region may have a width of 0.5 mm, whereas outside the fold region the warp yarns may have a width of 0.3 mm or less. The thicker yarns could also be achieved by doubling up on yarns of the same diameter. In the case of monofilament yarns the fold region may be made of yarns 0.3 mm or less but double the amount compared to the non folded region where they are singular. Where the netting is of a knitted construction, the netting in the fold region may comprise a stronger or larger cross section yarn than outside the fold region.

In some embodiments, the cross section or strength of the yarns in the fold region may be the same as the cross section or strength of the yarns outside the fold region.

Figure 17:
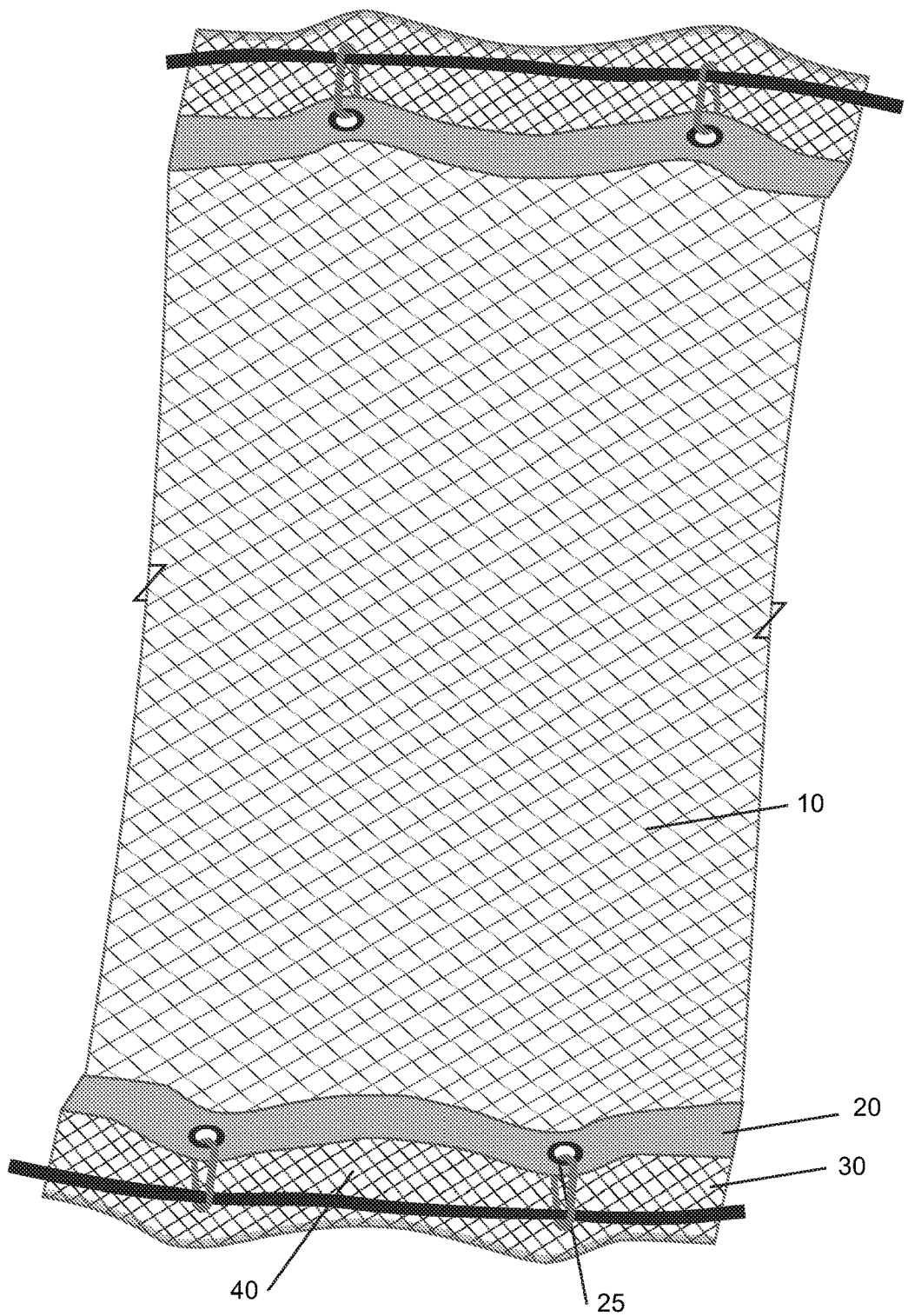
FIG. 17 is a pictorial representation of a netting material comprising a flap 20 for securing the netting material with clips and a wire.

The longitudinal flap comprising eyelets described herein is especially useful for anchoring netting material to posts or structures above a row of trees. A portion of the width of the netting outside of the flap can hang below the flap to cover sides of trees or plants below the elevation of the flap. This arrangement allows the netting to be held above the trees or plants at a distance from the trees, so that an air gap is present between the netting and the trees or plants. This arrangement is particularly useful for bird netting, insect netting, and hail protection netting as the air space between the netting and the trees or plants aids the prevention of birds, insects and hail reaching the plants beneath the netting. Furthermore, the portion of the width of the netting outside flap can be arranged to contact the ground so that there are no gaps between the edge of the netting and the ground, or where the grommet is attached to a wire, then a scalloping gap 40 that forms between the points of attachment at each grommet 25 is filled or covered with the side portion 30 of the width of the netting provided outside the flap 20, as illustrated in FIG. 17. This assists to prevent birds or insects passing around the netting. Where eyelets are provided to the edge of the netting, gaps between the edge of the netting and the ground are difficult to close due to scalloping or dishing of the netting between connection points.

The foregoing describes the invention including a preferred form thereof, alterations and modifications as will be obvious to those skilled in the art are intended to be incorporated in the scope hereof, as defined in the accompanying claims.

The invention claimed is:

1. A netting material having a length extending in a first direction and a width extending in a second direction, perpendicular to the first direction, the width being smaller than the length, the netting material comprising:
   a main portion of the netting material having first weight per unit area;
   a first longitudinal edge of the netting extending in the first direction, along the length of the netting;
   a second longitudinal edge of the netting extending in the first direction, along the length of the netting, the second being spaced from the first longitudinal edge and having the main portion of the netting material positioned between them;
   a fold region have a second weight per unit area, the second weight per unit area being higher than the first weight per unit area, the fold region extending in the first direction, the fold region being positioned between the first and second longitudinal edges;
   a first flap folded from the fold region of the netting material, the flap being positioned along a longitudinal netting fold line at a distance from one of the longitudinal edges of the netting, the flap comprising at least two layers of the netting material of the fold region being folded together, the weight per unit area of the netting material that is folded together at the flap being higher than the first weight per unit area of the netting material of the main portion that is outside the fold region,
   a strip of reinforcing material positioned along the length of the netting material, the strip of reinforcing material having two portions and folded along a longitudinal fold line between the two portions, the fold being coincident with the netting fold line and having a portion on both sides of the flap, with the flap of the netting sandwiched between the two portions, and
   eyelets spaced apart along the length of the netting material, the eyelets extending through the folded flap and through both portions of the strip of reinforcing material, the flap extending in the first direction and perpendicular to the width of the net.

2. The netting material as claimed in claim 1 wherein the strip of reinforcing material is stitched to the netting material.

3. The netting material as claimed in claim 1 wherein the flap that is sandwiched within the folded strip of the reinforcing material and the netting material comprising the fold region comprises a different construction to the netting material outside the fold region.

4. The netting material as claimed in claim 1 wherein the first weight per unit area of the netting in the fold region is in the range of 180 grams/m$^2$ to 280 grams/m$^2$ and the second weight per unit area of the netting outside the fold region is in the range of 25 grams/m$^2$ to 160 grams/m$^2$.

5. The netting material according to claim 1 which has a cover factor outside the fold region of less than 80%.

6. The netting material according to claim 5 wherein at least a portion of the fold region of the netting has a cover factor of greater than 90%.

7. The netting material as claimed in claim 1 wherein the fold region is folded to create the flap with a height of 35 mm to 55 mm.

8. The netting material as claimed in claim 1 wherein the flap is formed 20 mm to 500 mm from the longitudinal edge of the netting material.

9. The netting material as claimed in claim 1 wherein the netting material comprises a second flap having identical construction as the first flap and having apertures identical in construction to the apertures of the first flap, the first flap being located a first distance from the first longitudinal edge of the netting material and the second flap being located the same distant from the second longitudinal side as the first distance.

10. The netting material as claimed in claim 1 wherein the netting material comprises a second flap having identical construction as the first flap and having eyelets identical in construction to the eyelets of the first flap, the second flap being near to a center of the width of the netting material, being positioned about the same distance between the first and second longitudinal sides.

11. The netting material according to claim 1 wherein the eyelets compromise grommets defining holes through the flap.

12. The netting material according to claim 1, wherein the flap includes only two layers of netting material folded together.

13. A method of treating a plant, or fruit or vegetables thereon, which comprises providing over and/or adjacent the plant as bird netting, insect netting, shade netting, wind screen netting, or hail protection netting a netting material according to claim 1.

14. A netting material having a length dimension and a width dimension smaller than the length dimension, the netting material comprising:
   a flap folded from the netting material along the length of the netting material along a netting fold line and spaced inward from a longitudinal edge of the netting towards a longitudinal axis of the netting, the flap comprising at least two layers of the netting material folded together, the weight per unit area of the netting material in the fold region being higher than the weight per unit area of the netting material outside the fold region,
   a separate strip of reinforcing material folded along a longitudinal fold line coincident with the netting fold line and over the flap, wherein the flap is sandwiched within the folded reinforcing material, and
   eyelets spaced apart along the length of the netting material, through the flap and the strip of reinforcing material.

* * * * *